United States Patent
McArdle et al.

(10) Patent No.: US 9,644,787 B2
(45) Date of Patent: May 9, 2017

(54) VIDEOCONFERENCING EQUIPMENT ASSEMBLY AND RELATED METHODS

(71) Applicant: Zdi, Inc., Normal, IL (US)

(72) Inventors: Justin McArdle, Heyworth, IL (US); Aaron McArdle, Heyworth, IL (US); Shaun Webb, Farmersville, IL (US)

(73) Assignee: ZELLER DIGITAL INNOVATIONS, INC., Normal, IL (US)

( * ) Notice: Subject to any disclaimer, the term of this patent is extended or adjusted under 35 U.S.C. 154(b) by 277 days.

(21) Appl. No.: 13/800,757

(22) Filed: Mar. 13, 2013

(65) Prior Publication Data
US 2014/0267557 A1    Sep. 18, 2014

(51) Int. Cl.
*F16M 13/02*    (2006.01)
*G06F 1/16*    (2006.01)
*F16M 11/04*    (2006.01)

(52) U.S. Cl.
CPC .......... *F16M 13/02* (2013.01); *F16M 11/048* (2013.01); *G06F 1/1601* (2013.01)

(58) Field of Classification Search
USPC ...................................... 345/14.08
See application file for complete search history.

(56) References Cited

U.S. PATENT DOCUMENTS

| | | | |
|---|---|---|---|
| 6,332,659 B1 | 12/2001 | Cook et al. | |
| 7,663,706 B2 | 2/2010 | Ryu | |
| 7,697,289 B1 | 4/2010 | Liao | |
| 7,869,201 B2 | 1/2011 | McCoy et al. | |
| 8,021,018 B2 | 9/2011 | Zheng et al. | |
| 8,024,451 B2* | 9/2011 | Fowler et al. ................ | 709/224 |
| 8,313,072 B2 | 11/2012 | Bakkom et al. | |
| 8,324,503 B2 | 12/2012 | Pastoriza et al. | |
| 2005/0231587 A1* | 10/2005 | Root ........................ | H04R 5/02 348/14.07 |
| 2006/0261226 A1* | 11/2006 | Petrick ................... | F16M 11/10 248/274.1 |
| 2007/0170325 A1 | 7/2007 | Ryu | |
| 2008/0237424 A1* | 10/2008 | Clary ......................... | 248/283.1 |
| 2009/0231808 A1 | 9/2009 | Burgner | |
| 2011/0108688 A1* | 5/2011 | Parruck .................. | F16M 11/04 248/217.4 |

OTHER PUBLICATIONS

"Multifunctional Wall Mount TV Stand from Fimar", http://freshome.com/2009/12/02/multifunctional-wall-mount-tv-stand-from-fimar/, 4 pages, Oct. 15, 2013.
"Side System 25", TV Rack, http://www.fimarmobili.com/porta_tv.side25.htm, 1 page, Oct. 15, 2013.
"Media Wall Hides the Television in Plain Sight", http://houzz.com/ideabooks/921686/list/Media-Wall-Hides-the-Television-in-Plain-Sight, 3 pages, Feb. 11, 2014.
"Custom Fit Flat Wall Mount for Posiflex KS6812", http://practicalqualitysystems.com/product-details.php?id=348&flag=product&id_support=, 1 page, Oct. 11, 2014.

* cited by examiner

*Primary Examiner* — Amal Zenati
(74) *Attorney, Agent, or Firm* — Harness, Dickey & Pierce, P.L.C.

(57) ABSTRACT

An assembly of videoconferencing equipment includes a flat panel display, a structure mounting the flat panel display to a support surface, and videoconferencing equipment mounted to the structure. The structure and the videoconferencing equipment mounted to the structure are substantially concealed from view by the flat panel display from a front side of the flat panel display.

18 Claims, 4 Drawing Sheets

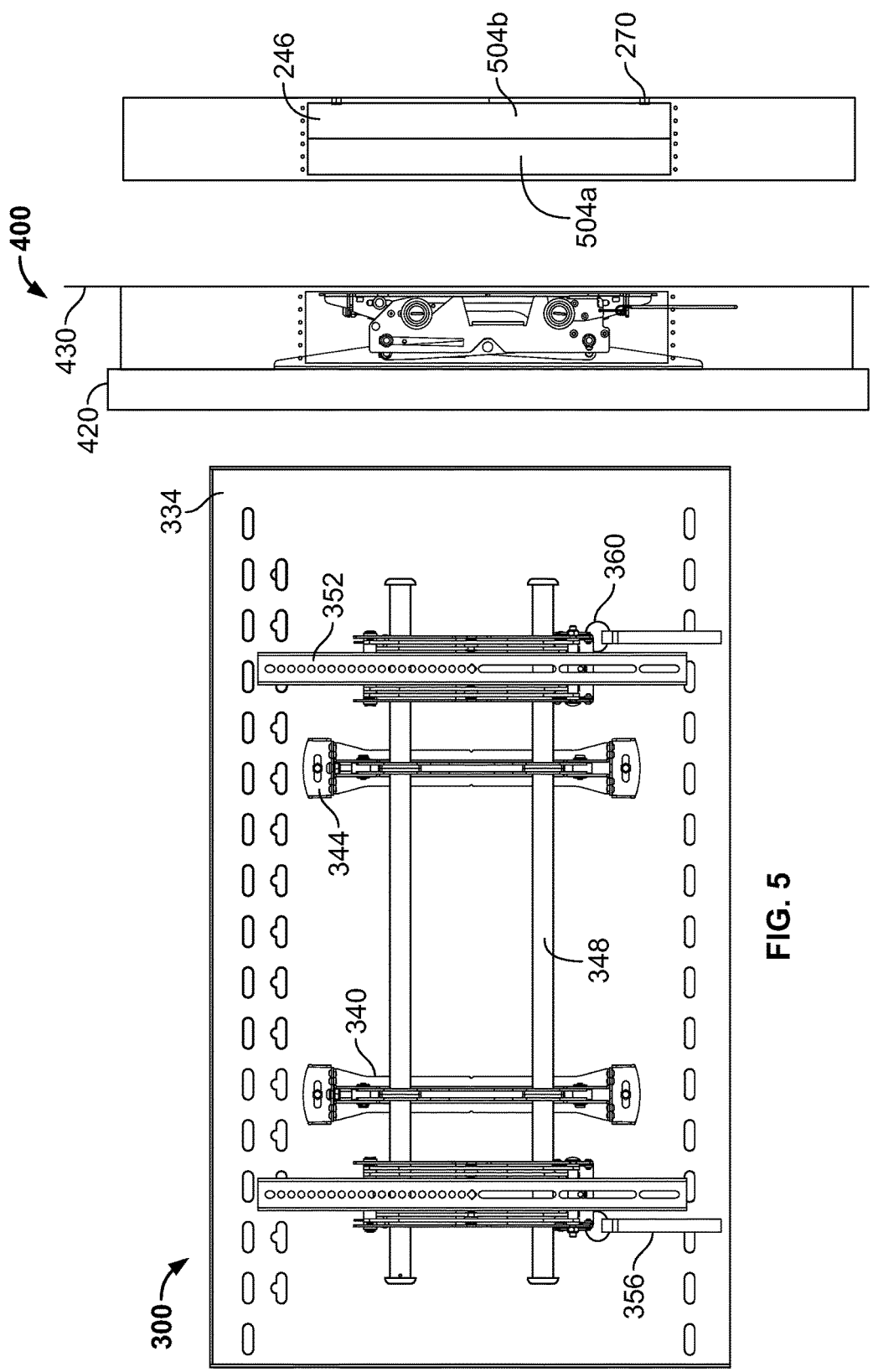

VIDEOCONFERENCING EQUIPMENT ASSEMBLY AND RELATED METHODS

FIELD

The present disclosure relates to a videoconferencing equipment assembly and related methods.

BACKGROUND

This section provides background information related to the present disclosure which is not necessarily prior art.

Installing videoconferencing equipment in a conference room can be complicated and expensive, due at least in part to the fact that many variables typically need to be addressed. Room construction, furniture layout, and building infrastructure all need to be taken into account so that videoconferencing equipment components may be installed in appropriate room locations with appropriate wiring, power and ventilation.

SUMMARY

This section provides a general summary of the disclosure, and is not a comprehensive disclosure of its full scope or all of its features.

In one example embodiment, the disclosure is directed to an assembly of videoconferencing equipment. The assembly includes a flat panel display, a structure mounting the flat panel display to a support surface, and videoconferencing equipment mounted to the structure. The structure and the videoconferencing equipment mounted to the structure are substantially concealed from view by the flat panel display from a front side of the flat panel display.

In another example implementation, the disclosure is directed to a method of installing videoconferencing equipment. The method includes mounting a structure to a support surface, and mounting a flat panel display to the structure. The method also includes mounting videoconferencing equipment to the structure so that the flat panel display substantially conceals the equipment and structure when viewed from a front side of the flat panel display.

In still another example implementation, the disclosure is directed to an assembly of videoconferencing equipment. The assembly includes an equipment rack and a bracket mounted through the equipment rack to a support surface. A flat panel display is mounted to the bracket. Videoconferencing equipment is mounted to the rack. The rack and the videoconferencing equipment mounted thereto are substantially concealed from view by the flat panel display from a front side of the flat panel display.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a front view of a structure in accordance with one implementation of the disclosure;

FIG. 6 is a side sectional view of a structure and display unit mounted thereto in accordance with one implementation of the disclosure; and FIG. 7 is a side view of an equipment rack to which videoconferencing equipment is mounted in accordance with one implementation of the disclosure.

Corresponding reference numerals indicate corresponding parts throughout the several views of the drawings.

DETAILED DESCRIPTION

Figure 1:
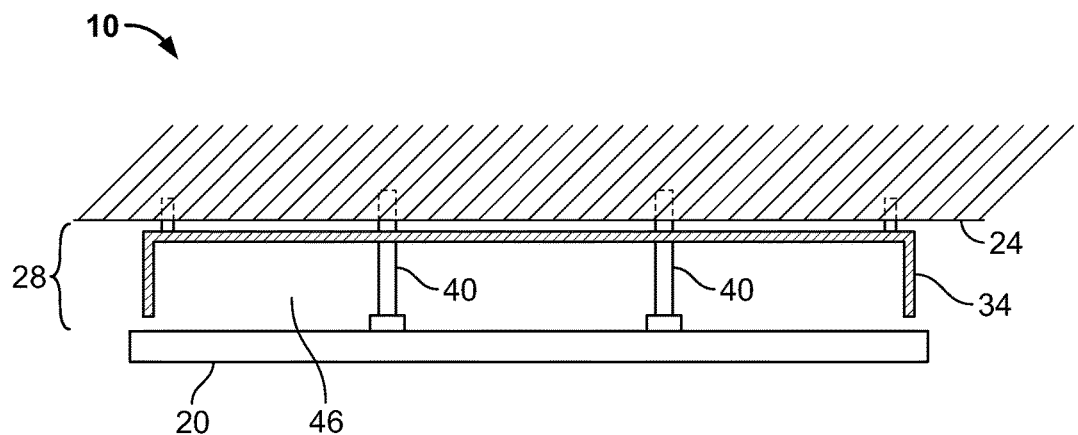
FIG. 1 is a top sectional view of an assembly of videoconferencing equipment in accordance with one implementation of the disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The inventors have observed that when a videoconferencing system is to be installed in a room, it can be a challenge to find space for the various pieces of equipment and to situate wiring and cables in relation to the room's furnishings. There are essentially no standards for installing videoconferencing equipment, and it can take time and money to arrive at a custom solution for installing such equipment. Accordingly, in various embodiments, the disclosure is directed to an assembly of videoconferencing equipment. Multiple pieces of videoconferencing equipment may be installed, e.g., between a flat panel display and a support surface such as a wall. Pieces of equipment in the assembly can be easily removed, e.g., temporarily for servicing.

In some embodiments, an assembly of videoconferencing equipment includes a flat panel display, a structure mounting the flat panel display to a support surface, and videoconferencing equipment mounted to the structure. The structure and the videoconferencing equipment mounted to the structure are substantially concealed, by the flat panel display, from view from a front side of the flat panel display.

One example embodiment of an assembly of videoconferencing equipment is indicated generally in FIG. 1 by reference number 10. A flat panel television display 20 is mounted to a support surface, e.g., a wall 24, by a structure 28 that includes, e.g., a bracket 40 and an equipment rack 34. The display 20 may be an eighty-inch LED display and is mounted on the bracket 40. Other display sizes and/or display types may be provided in various embodiments, dependent, e.g., on room dimensions. The equipment rack 34 is positioned between the display 20 and the wall 24 and is configured to receive videoconferencing equipment (not shown in FIG. 1). The bracket 40 is extendable through a frontal opening 46 in the equipment rack 34.

The equipment rack 34, equipment mounted to the rack 34, and the bracket 40 are all substantially concealed from view from a front side (i.e., the viewing side) of the flat panel display 20. The extendable bracket 40 allows the flat panel display 20 to be pulled away from the wall 24 and the equipment rack 34 to provide access to the equipment mounted to the rack. Although in the present example embodiment the equipment rack 34 and bracket 40 are separate components, in some other embodiments an equipment rack and bracket could be implemented as a single component.

Figure 2A:
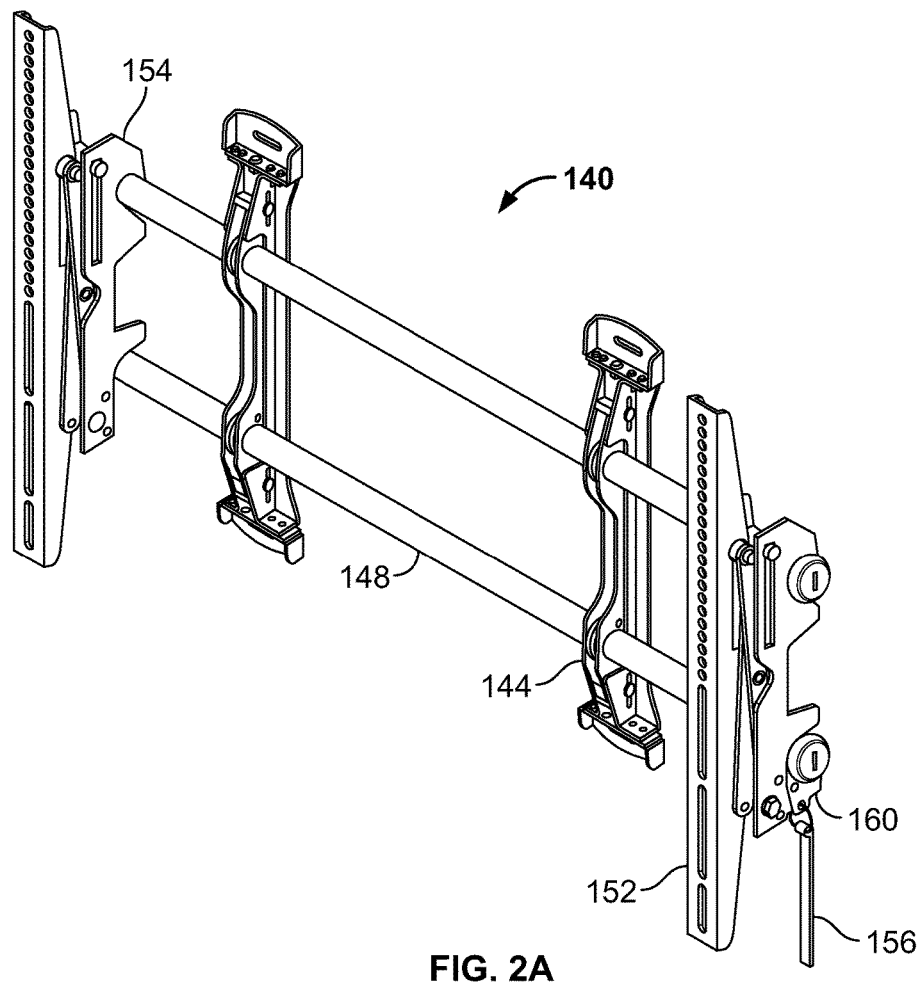
FIG. 2A is a perspective view of a bracket of a videoconferencing equipment assembly in accordance with one implementation of the disclosure.
Figure 2B:
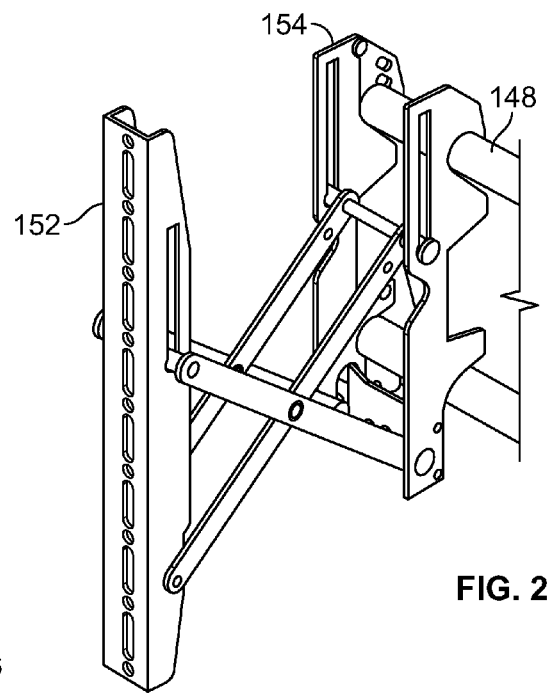
FIG. 2B is a partial perspective view of a bracket of a videoconferencing equipment assembly in accordance with one implementation of the disclosure.

One example embodiment of a bracket is indicated generally in FIG. 2A by reference number 140. The bracket 140 includes wall mounts 144, support bars 148, and extendable uprights 152 onto which a flat panel display may be mounted. The uprights 152 are retained by frames 154 mounted on the support bars 148. Pull straps 156 are provided to release a restraint 160 so that the uprights 152 may be extended away from the frames 154, e.g., as shown in FIG. 2B. In some embodiments the wall mounts 144 are horizontally adjustable along the support bars 148 so that the bracket may be adjusted prior to installation, e.g., to accommodate various display and equipment sizes. One example bracket is a model LSMVU mount available from Chief Manufacturing, a division of Milestone AV Technologies, www.chiefmfg.com. Other or additional brackets may be used in various embodiments, including but not limited to standard off-the-shelf video wall mounts.

Figure 3:
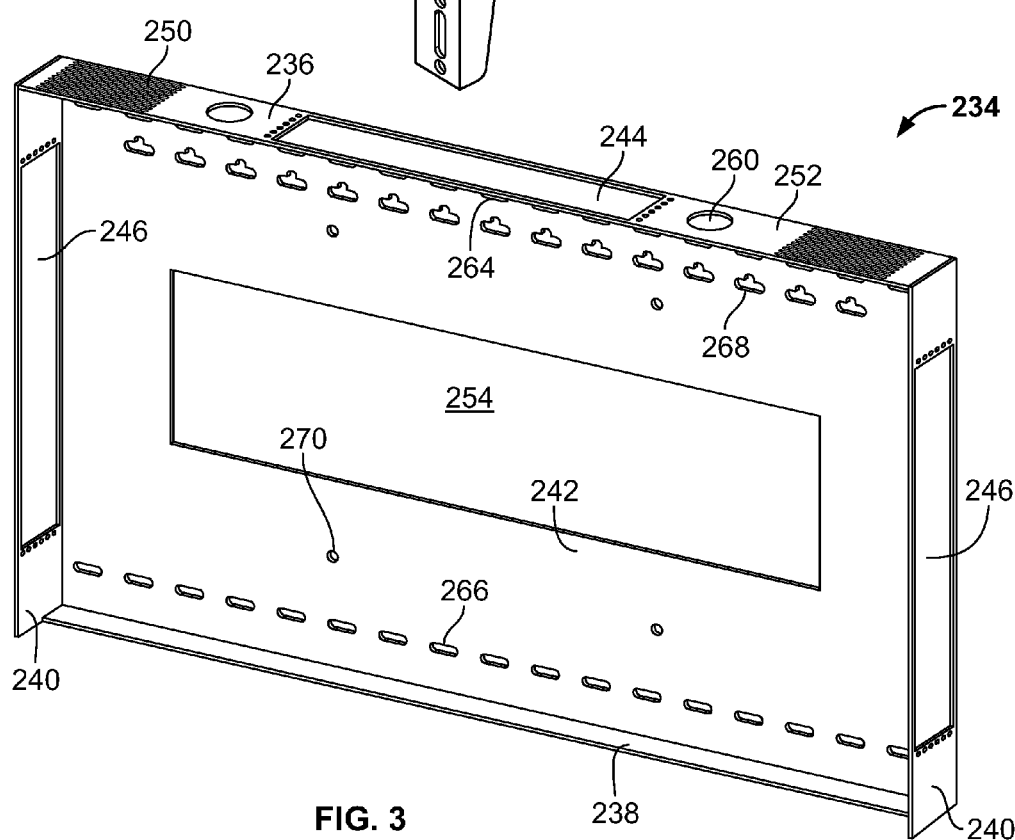
FIG. 3 is a perspective view of an equipment rack in accordance with one implementation of the disclosure.

One example embodiment of an equipment rack is indicated generally in FIG. 3 by reference number 234. The rack 234 includes a top 236, a bottom 238, sides 240, and a rear panel 242 by which the rack may be mounted to a support surface. A rack mount 244 in the top 236 and rack mounts 246 in the sides 240 are configured to receive pieces of videoconferencing equipment, e.g., standard rack mountable (2U) equipment. If, e.g., a rack mount 244 or 246 is unoccupied, it can be "blanked off" with a custom panel made in an industry-standard size. The top rack mount 244 may provide, e.g., a standards-based (e.g., 2U) opening. In one example embodiment, the top rack mount 244 may house a component having a depth of up to 9.75 inches, e.g., a video/content receiver such as a Barco ClickShare® or Crestron® DM-RMC-SCALER-C. In a given side rack mount 246 in which two rack units are available, the rack unit next to the rear panel 242 may be capable of holding equipment up to 11.5 inches deep, and the adjacent rack unit may be capable of holding equipment up to 13.75 inches deep. In some embodiments, a videoconferencing codec such as a Cisco® C40 codec may be installed in one rack unit of the side rack mounts 246. A controller such as a Crestron® MC3 may be installed in a side rack mount 246 that provides a 2U space. An HDMI video transmitter/receiver such as an Extron® DTP 230 HDMI Tx/Rx may also be installed in the rack 234. It should be noted generally that the foregoing pieces of equipment are examples only, and that other or additional pieces and types of equipment could be mounted between the display and the wall.

The rack top 236 includes a pair of top vents 250, one on each side 252 of the rack top 236. The vents 250 provide ventilation for equipment housed inside the rack. The rack 234 includes two fans (not shown) mounted therein below the vents 250. In various embodiments, fewer than or more than two vents, and/or fewer than or more than two fans, may be provided. The vents 250 may serve to quiet the fans, e.g., to less than 50 decibels, C-weighted sound pressure level. The fans may be activated, e.g., using a temperature sensing power supply. Thus the equipment rack 234 may also include a temperature sensor (not shown). A rear opening 254 is provided whereby, e.g., power and/or data wiring, cabling and/or other infrastructure provided in a wall to which the rack is mounted may be routed from the wall into the rack 234.

The top 236 also includes a pair of pass-throughs 260. Each pass-through 260 is configured to provide a pathway from a speaker system installed in and/or near the rack 234. Such a system may include a videoconferencing camera mounted above the rack, and a speaker mounted below a video display installed in front of the rack. Cables for such a speaker system may be passed through the pass-throughs 260 and connected, e.g., to a power supply available through the rack rear opening 254. In the present example embodiment the pass-throughs 260 are about two inches in diameter. In some other embodiments, fewer than or more than two pass-throughs, which may be bigger or smaller than the pass-throughs 260, may be provided.

The rear panel 242 of the rack 234 includes top mounting holes 264 (barely visible in FIG. 3) for attaching the rack 234 to a support surface. An installer may use the mounting holes 264 to position the rack on a wall. In some embodiments, the holes 264 are configured to span at least three wall studs. Bottom mounting holes 266 also may be provided, to facilitate mounting of the bottom of the rack 234 to a wall. Bottom mounting can serve to prevent the rack 234 from coming off a wall when a bracket and display mounted thereto are being pulled away from the wall.

Pre-hang holes 268 are provided, e.g., to allow an installer to quickly attach the rack 234 to a wall. Thus an installer may temporarily install the rack 324 while a bracket is being leveled and aligned. In such manner, the weight of the rack 234 may be minimized to facilitate installation. Mounting holes 270 are provided whereby a bracket is attachable to the rack, e.g., by nuts and screws, bolts, etc.

The rack bottom 238 may serve as a resting place, e.g., for cable(s) that might be otherwise unsecured inside the rack 234. In the present example embodiment the bottom 238 is narrower than the sides 240. In some other embodiments, a rack bottom may be coextensive with sides of the rack but nevertheless may provide an opening in the rack. A user can reach under a display installed adjacent the rack 234, reach through the bottom 238, and reach bracket pull straps to release the bracket so that the display mounted thereto may be pulled away from the support surface. The narrow bottom 238 also allows air to enter the rack 234 that is evacuated by the fans through the top vents 250.

Figure 4:
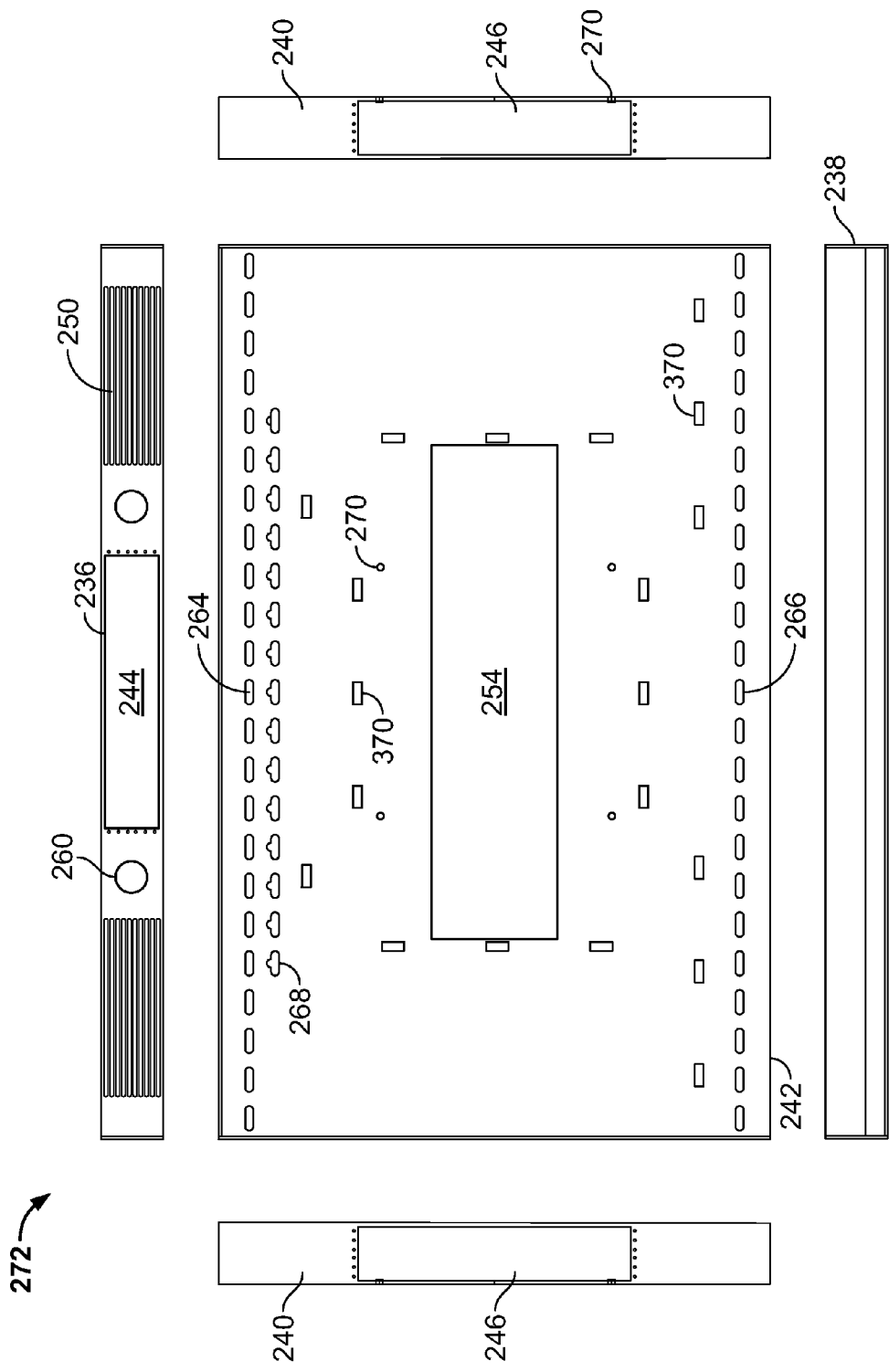
FIG. 4 is an exploded view of an equipment rack in accordance with one implementation of the disclosure.

Another example embodiment of an equipment rack is indicated generally in FIG. 4 by reference number 272. The rack 272 includes a rear panel 242 in which wire management points 370 are provided. Additionally or alternatively, wire management points 370 may be provided in locations where wiring enters or leaves the rack. Wire management points 370 are, e.g., raised metal points configured to allow, e.g., half-inch wide Velcro strips to be extended under wiring and to route wiring through the rack 272.

An example embodiment of a structure suitable for an assembly of videoconferencing equipment is indicated generally in FIG. 5 by reference number 300. The structure 300 includes a bracket 340 and an equipment rack 334. The bracket 340 includes wall mounts 344, support bars 348, and extendable uprights 352 onto which a flat panel display may be mounted. Pull straps 356 are provided to release restraints 360 so that the uprights 352 and a display mounted thereon may be moved away from a support surface to which the structure 300 is mounted.

FIG. 6 illustrates an example embodiment of a structure 400 and display unit 420 mounted thereto. The structure 400 is mounted to a support surface, e.g., a wall 430. FIG. 7 illustrates an example embodiment of an equipment rack 500. Two example pieces 504a and 504b of videoconferencing equipment are mounted in adjacent rack units of a 2U side rack mount 246.

To install a videoconferencing equipment assembly in accordance with one example implementation of the disclosure, a user, e.g., an installer, may mount a structure, e.g., an equipment rack and a bracket, to a support surface, e.g., a wall. The installer may mount a flat panel display on the structure, and may mount videoconferencing equipment to the structure so that the flat panel display substantially conceals the equipment and structure when viewed from a front side of the flat panel display.

The foregoing assembly makes it possible to store equipment and wiring in a single convenient, predetermined location. Equipment that is not required to be located in specific room locations can be installed in the equipment rack, thereby simplifying the process of installing videoconferencing systems. The use of a flat panel display instead of, e.g., a projector and projection screen allows the use of space behind the display for housing equipment.

The foregoing rack offers more space and convenience than, e.g., equipment storage areas in wall cavities, which are typically limited to sixteen-inch spaces between studs. In contrast, many pieces of commercial audiovisual equipment are nineteen inches wide. Additionally, an installer often does not know beforehand whether a given wall cavity might be occupied by other infrastructure. Because space outside a wall is used by the foregoing assembly, variability in an installation process can be reduced or eliminated as to studs and other structures that might be present in the wall. Adequate space for equipment can be provided in almost any videoconferencing environment.

By locating multiple pieces of equipment in or around the equipment rack, variables can be reduced or eliminated in running wires to a table, ceiling and/or other pieces of furniture. Most if not all infrastructure requirements for power, data, ventilation, and building construction can be localized through using implementations of the foregoing videoconferencing equipment assembly. In some installations in accordance with implementations of the disclosure, it is possible that the only wires extending away from the assembly are a wire to a ceiling-mounted microphone and a data cable to a table location, e.g., to a touch panel or other videoconferencing system user interface. All or substantially all other wiring can be localized to the display and to the equipment rack. Thus wiring can be installed in a very short time compared to the time it would typically take to install wiring for other videoconferencing systems.

Using the space behind the display allows the use of industry standard spacing (rack units) in which to hold commercial equipment while providing wire management and promoting consistency in a videoconferencing system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly of videoconferencing equipment, the assembly comprising:

a flat panel display;
a structure mounting the flat panel display to a support surface; and
videoconferencing equipment mounted to the structure, the videoconferencing equipment including a codec, a controller and/or a video/content receiver separate from the flat panel display and mounted to the structure;
wherein the structure includes an equipment rack having at least a first rack mount and a second rack mount, wherein a first one of the codec, the controller and/or the video/content receiver is mounted to the first rack mount, wherein a second one of the codec, the controller and/or the video/content receiver is mounted to the second rack mount, and wherein the structure and the codec, controller and/or video/content receiver mounted to the structure are substantially concealed from view by the flat panel display from a front side of the flat panel display.

2. The assembly of claim 1 wherein the structure includes a bracket mounting the flat panel display to the support surface.

3. The assembly of claim 2, wherein the bracket is configured to allow the flat panel display to be pulled away from the support surface and the equipment rack to provide access to the equipment mounted to the rack.

4. The assembly of claim 2, wherein the equipment rack includes a fan and/or temperature sensor.

5. The assembly of claim 2, wherein the videoconferencing equipment includes one or more standard rack mountable pieces each corresponding to one or more standard-sized rack units.

6. The assembly of claim 1 wherein the support surface is a substantially flat wall without openings for receiving videoconferencing equipment.

7. A videoconferencing system comprising the assembly of claim 1.

8. A method of installing videoconferencing equipment, the method comprising:
mounting a structure to a support surface;
mounting a flat panel display to the structure; and
mounting videoconferencing equipment, including a codec, a controller, and/or a video/content receiver separate from the flat panel display, to the structure so that the flat panel display substantially conceals the codec, controller, and/or video/content receiver and structure when viewed from a front side of the flat panel display;
wherein the structure includes an equipment rack having at least a first rack mount and a second rack mount, wherein a first one of the codec, the controller and/or the video/content receiver is mounted to the first rack mount, and wherein a second one of the codec, the controller and/or the video/content receiver is mounted to the second rack mount.

9. The method of claim 8, wherein the structure includes a bracket, and wherein mounting the structure comprises mounting the bracket and the equipment rack to the support surface.

10. The method of claim 9, wherein mounting the flat panel display comprises mounting the flat panel display on the bracket.

11. The method of claim 9, further comprising pulling the mounted flat panel display away from the support surface to provide access to the videoconferencing equipment mounted to the equipment rack.

12. The method of claim 8, performed without mounting a piece of the videoconferencing equipment in a wall cavity.

13. The method of claim 8, wherein the first rack mount and the second rack mount are standard-sized rack units.

14. An assembly of videoconferencing equipment, the assembly comprising:
an equipment rack and a bracket mounted through the equipment rack to a support surface, the equipment rack including at least a first rack mount and a second rack mount;
a flat panel display mounted to the bracket; and
videoconferencing equipment mounted to the rack, the videoconferencing equipment including a codec, a controller, and/or a video/content receiver separate from the flat panel display and mounted to the equipment rack, a first one of the codec, the controller and/or the video/content receiver mounted to the first rack mount, and a second one of the codec, the controller and/or the video/content receiver mounted to the second rack mount;
wherein the equipment rack and the codec, controller, and/or video/content receiver mounted thereto are substantially concealed from view by the flat panel display from a front side of the flat panel display.

15. The assembly of claim 14, wherein the support surface is a substantially flat wall without openings for receiving videoconferencing equipment.

16. The assembly of claim 14, wherein the bracket is configured to allow the flat panel display to be pulled away from the support surface and the equipment rack to provide access to the equipment mounted to the rack.

17. The assembly of claim 14, wherein the equipment rack includes a fan and/or temperature sensor.

18. The assembly of claim 14, wherein the videoconferencing equipment comprises one or more standard rack mountable pieces each corresponding to one or more standard-sized rack units.

* * * * *